United States Patent [19]
Laporte et al.

[11] Patent Number: 6,039,349
[45] Date of Patent: Mar. 21, 2000

[54] DEVICES WITH INFLATABLE MEMBERS FOR PROTECTING VEHICLES AGAINST IMPACTS

[75] Inventors: Jean-Jacques Laporte, La Rochelle; Eric Tassily, L'Houmeau; Frédéric Muttin, La Rochelle, all of France

[73] Assignee: GEC Alsthom Transport SA, Paris, France

[21] Appl. No.: 09/100,960

[22] Filed: Jun. 22, 1998

[30] Foreign Application Priority Data

Jun. 23, 1997 [FR] France ................... 97 07 769

[51] Int. Cl.$^7$ ................................ B60R 19/02
[52] U.S. Cl. ..................... 280/748; 280/770; 293/107
[58] Field of Search ............... 180/274; 102/530, 102/531; 293/107, 133; 280/743.1, 729, 730.1, 730.2, 731, 770, 762

[56] References Cited

FOREIGN PATENT DOCUMENTS

| 2 123 700 | 9/1972 | France . |
| 2 153 941 | 5/1972 | Germany . |
| 39 13 660 C1 | 8/1990 | Germany . |
| 43 04 152 A1 | 8/1993 | Germany . |

Primary Examiner—Brian L. Johnson
Assistant Examiner—Tony Winner
Attorney, Agent, or Firm—Sughrue, Mion, Zinn, Macpeak & Seas, PLLC

[57] ABSTRACT

In a device with inflatable members for protecting vehicles against impacts, once inflated, the inflatable members are disposed alongside each other so as to have a general shape substantially identical to the general shape of the area of the vehicle to be protected. The inflatable members each have a general shape enabling them to be interleaved laterally with the two directly adjacent inflatable members.

5 Claims, 2 Drawing Sheets

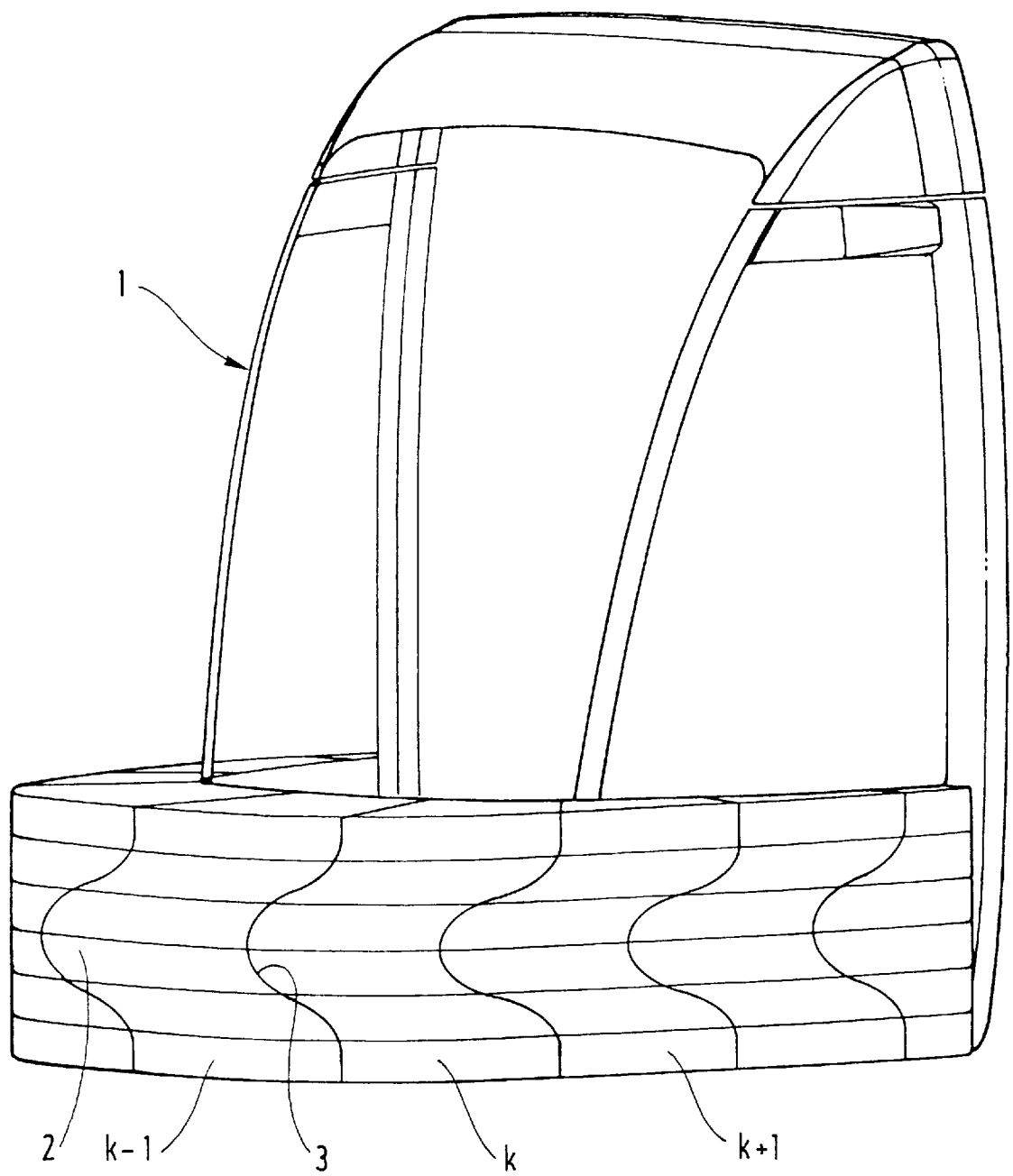

DEVICES WITH INFLATABLE MEMBERS FOR PROTECTING VEHICLES AGAINST IMPACTS

BACKGROUND OF THE INVENTION

1. Field of the Invention

The present invention concerns inflatable members for protecting vehicles against impacts in general and in particular a device with inflatable members for protecting vehicles against impacts.

The device in accordance with the invention with inflatable members for protecting vehicles against impacts preferably applies to the railroad field.

By "inflatable member" is meant here any member of the inflatable bag type usually called an air bag in the automotive field.

2. Description of the Prior Art

Document GB 2 020 234 shows the use of a device with inflatable members at the front of a railroad vehicle.

Gas generators are used to open the inflatable members.

A device of the above kind can protect all of the front part of the vehicle in the event of an impact.

This is not the case, however, if, during a collision, the object strikes the device with inflatable members in a direction other than the direction perpendicular to the vertical plane tangential to the inflatable members.

In this case, and depending on the angle between the direction of the object striking the device with inflatable members and the direction perpendicular to the vertical plane tangential to the inflatable members, the protection can be totally or partially ineffective because of lateral retraction between inflatable members.

Accordingly, one aim of the invention is a device with inflatable members for protecting vehicles against impacts which optimizes the performance of the inflatable members.

Here, "optimization" means that the inflatable members that receive the impact must deform in a balanced manner, that is to say without buckling, in order to ensure maximal absorption of energy.

SUMMARY OF THE INVENTION

The device in accordance with the invention with inflatable members for protecting vehicles against impacts is as defined in the claims.

One advantage of the device in accordance with the invention with inflatable members for protecting vehicles against impacts is that it is effective regardless of the object colliding with the vehicle equipped with the device of the invention.

Another advantage of the device in accordance with the invention with inflatable members for protecting vehicles against impacts is that it is safe because if an inflatable member does not inflate in the event of a collision the performance of the device with inflatable members remains close to the performance of the complete device with inflatable members.

BRIEF DESCRIPTION OF THE DRAWINGS

Other aim, features and advantages of the invention will become apparent upon reading the description of the preferred embodiment of the device in accordance with the invention with inflatable members for protecting vehicles against impacts given with reference to the drawings in which the two figures are a general view of the device in accordance with the invention with inflatable members for protecting vehicles against impacts.

DETAILED DESCRIPTION OF THE PREFERRED EMBODIMENTS

Figure 1:
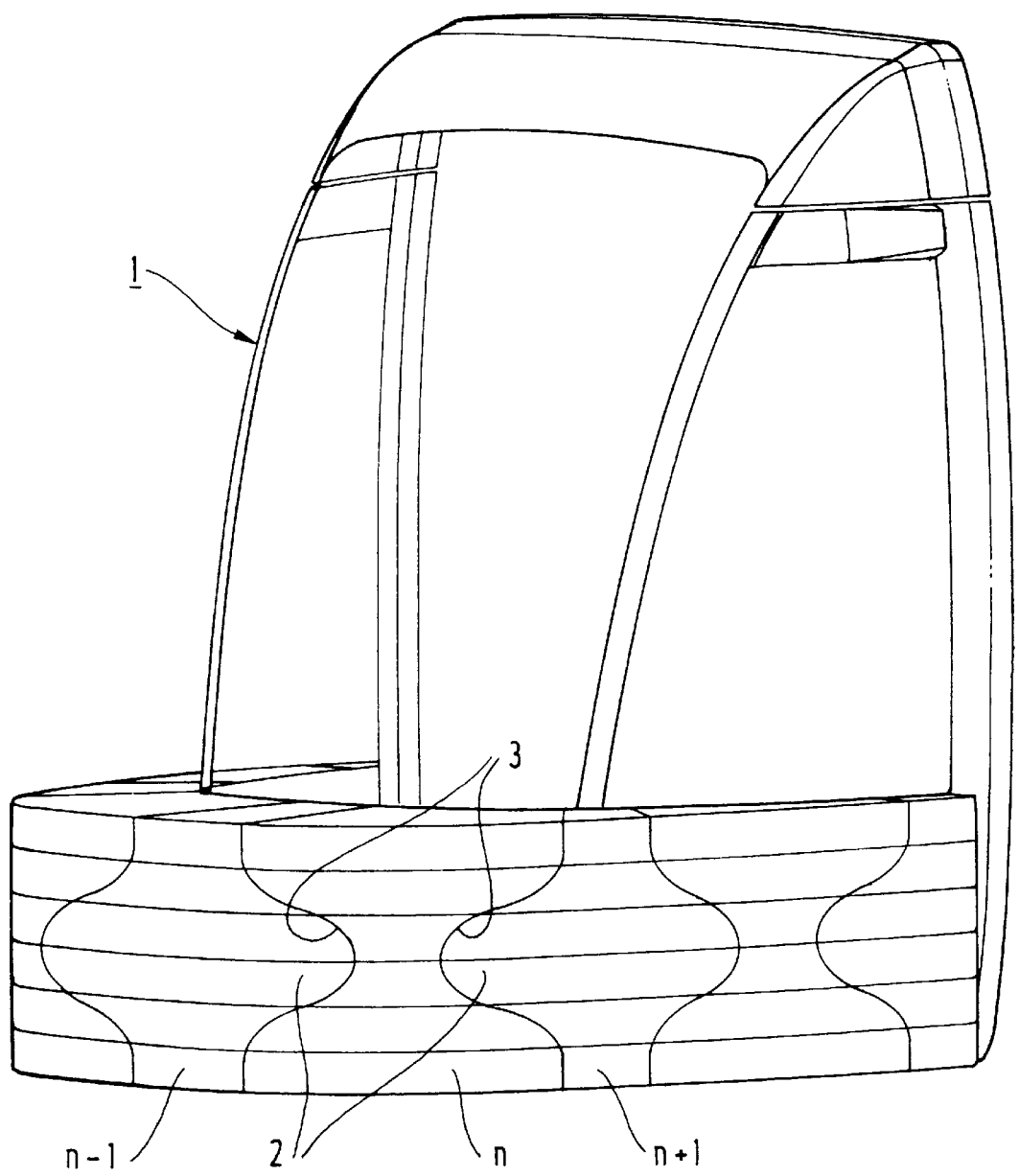

The device with inflatable members n, k for protecting vehicles 1 against impacts shown in FIGS. 1 AND 2 include a plurality of inflatable members.

Once inflated, the inflatable members are disposed alongside each other so as to have a general shape substantially identical to the general shape of the area of the vehicle to be protected.

Moreover, the inflatable members each have a general shape enabling them to be interleaved with the directly adjacent inflatable members.

In the event of an impact, the object comes into contact with one or more inflated members.

The impact deforms one or more of the inflated members.

The deformation of the inflated members is minimal because of the structure of the device with inflated members interleaved laterally with each other.

The inflated members not subjected directly to the impact prevent deformation of the inflated member or members subjected directly to the impact and optimize the performance of the inflatable members by blocking the space around the area of the inflated member or members subjected to the loads.

Moreover, the roughness of the material of the inflatable members slows relative displacement between them.

Finally, the interleaving of the inflatable members is such that regardless of the object colliding with the vehicle the inflatable members do not retract on impact.

In the preferred embodiment of the invention shown in the single figure the interleaving of the inflatable members is obtained by disposing a male type inflatable member and a female type inflatable member in succession.

The male type inflatable members have at least one protuberance 2 on their lateral faces.

The female type inflatable members have at least one cavity 3 on their lateral faces which face the protuberances on the male type inflatable members.

In another preferred embodiment the interleaving of inflatable members k is obtained by disposing in succession inflatable members on which one lateral face has at least one protuberance 2 and the other lateral face has at least one cavity 3.

The lateral faces having at least one protuberance 2 and belonging to an inflatable member k face the lateral faces having at least one cavity 3 belonging to the adjacent inflatable member k–1.

There is claimed:

1. A device with inflatable members for protecting vehicles against impacts wherein, once inflated, said inflatable members are disposed alongside each other so as to have a general shape substantially identical to the general shape of the area of the vehicle to be protected and said inflatable members each have a general shape enabling them to be interleaved laterally with the two directly adjacent inflatable members.

2. The device claimed in claim 1 wherein interleaving of said inflatable members is obtained by disposing in succession a male type inflatable member and a female type inflatable member.

3. The device claimed in claim 2 wherein said male type inflatable members have at least one protuberance on their lateral faces and said female type inflatable members have at least one cavity on their lateral faces which faces said protuberance of said male type inflatable members.

4. The device claimed in claim 1 wherein interleaving of said inflatable members is obtained by disposing in succession inflatable members of which one lateral face has at least one protuberance and the other lateral face has at least one cavity.

5. The device claimed in claim 4 wherein said lateral faces having at least one protuberance and belonging to one inflatable member face said lateral faces having at least one cavity belonging to the adjacent inflatable member.

* * * * *